P. J. RIVERS.
OAR AXLE.
APPLICATION FILED MAY 7, 1912.
1,038,962. Patented Sept. 17, 1912.
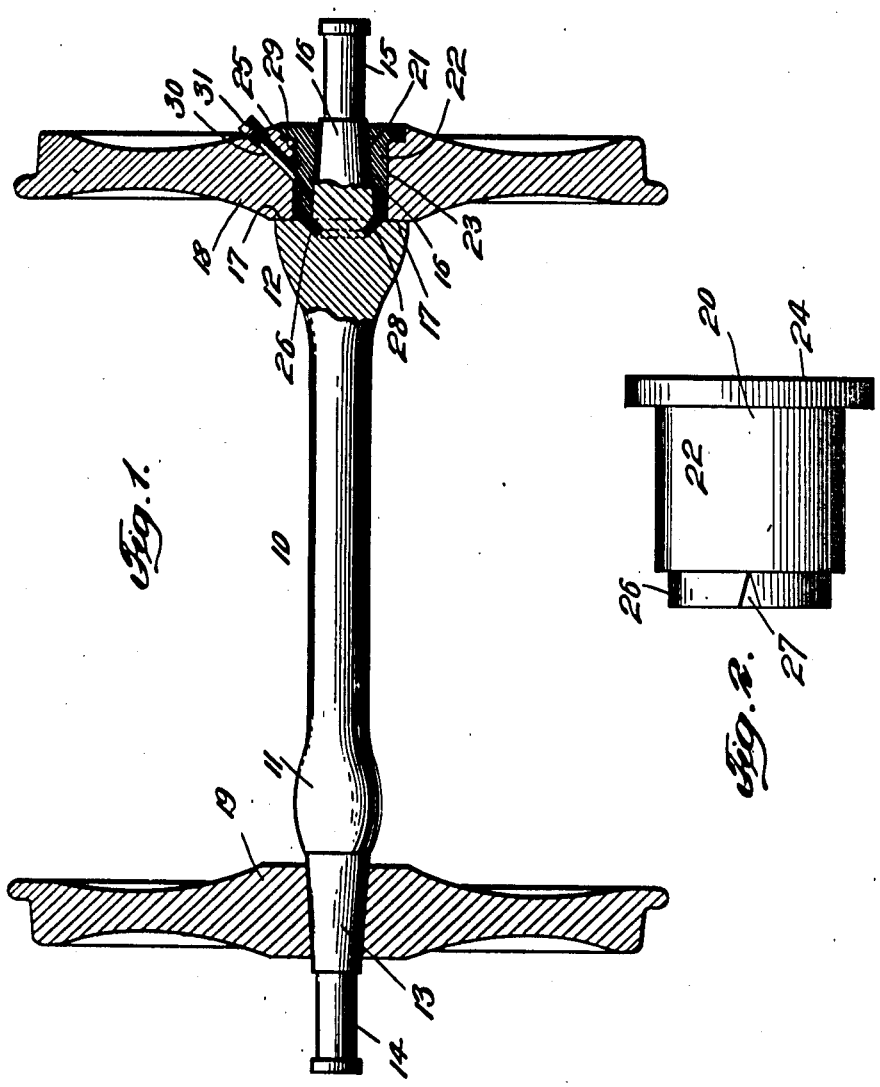
WITNESSES:
INVENTOR
P. J. Rivers
BY
ATTORNEYS

UNITED STATES PATENT OFFICE.

PHILIP J. RIVERS, OF NEW ROCHELLE, NEW YORK.

CAR-AXLE.

1,038,962.  Specification of Letters Patent.  Patented Sept. 17, 1912.

Application filed May 7, 1912. Serial No. 695,775.

*To all whom it may concern:*

Be it known that I, PHILIP J. RIVERS, a citizen of the United States, and a resident of New Rochelle, county of Westchester, and State of New York, have invented certain new and useful Improvements in Car-Axles, of which the following is a full, clear, and exact description.

This invention relates more particularly to axles for railway cars in which one wheel is fixed to the axle and the other wheel is adapted to rotate independently of the axle to overcome friction and binding of one wheel with relation to the other while turning curves.

Heretofore it has been proposed, so far as I am aware, to provide the axle with one wheel fixed and the other loosely mounted thereon in order that one wheel may rotate about the axle when the car is moving around curves and thereby overcome the binding effect due to one wheel necessarily having to rotate faster than the other while making turns. Such constructions have been impractical for the reason that the loose wheel has not been properly held to the axle and railroads have failed to adopt the same for the reason that they are liable to accidents. Some constructions provide bolts and similar fastening means, and others provide means for holding the loose wheel in such a way as to be liable to become loose or detached. It is necessary in axles of this kind that the loose wheel be held in a manner substantially as rigid as the fixed wheel and that both wheels should be held so as to be impossible of detachment under ordinary use, it being the common practice to force the fixed wheel on the tapered portion of the axle with many tons of pressure in order that the wheel cannot possibly become loose while in use.

The primary object of my invention is to provide simple and efficient means whereby both wheels may be applied to the axle in substantially the same way under similar pressure and under substantially the same conditions except that one wheel may have an independent movement about the axle, and at the same time so constructing and holding the wheels to the axle that the said wheels will under normal conditions move with the axle, and only a relative independent rotary movement given to the wheels while turning curves.

A further object of the invention is to provide a simple and efficient holding bushing which may be made to form substantially a part of the axle, and which is adapted to hold the wheel mounted thereon in as effective a manner as the ordinary fixed wheel is attached to the other end of the axle.

With these and other objects in view, the invention will be hereinafter more particularly described with reference to the accompanying drawings, which form a part of this specification, and will then be pointed out in the claims at the end of the description.

In the drawings, Figure 1 is a sectional view, partly in elevation, of one form of axle and wheels embodying my invention; and Fig. 2 in a detail view of one form of bushing that may be employed.

The axle 10 has enlarged portions 11 and 12 intermediate its ends, and at one end of the axle is a tapered portion 13 and at its opposite end has straight portions 14 and 15 of the usual construction for the axle boxes. The enlarged part 12 may be somewhat larger than the enlarged portion 11 and between the part 12 and the end 15 is a tapered portion 16. This tapered portion 16 extends outward from the part 12 and the said part 12 is faced off at 17 to provide a shoulder against which the inner surface of the hub portion of the wheel 18 is adapted to rest, there being another wheel 19 rigidly held to the tapered portion 13 of the axle in the usual way.

A bushing 20 of steel or any other suitable metal has a tapered opening 21 therethrough, and said bushing is adapted to fit and be rigidly held to the tapered portion 16 of the axle. This bushing or thimble has a straight cylindrical part 22 which is adapted to fit in a straight opening 23 of the car wheel in such a manner that the said car wheel may have an independent rotary movement about the bushing. The bushing at one end is provided with an integral collar 24 which is adapted to fit a recessed portion 25 in the wheel 18 so as to confine the wheel between the face 17 of the enlarged part 12 and said collar. At the inner end the bushing is somewhat reduced to provide a bendable substantially cylindrical portion 26. This part 26 may be of any desired length and to permit the same to bend without crimping it may be provided with one or more slots, as 27, to adapt the bushing when forced along the tapered portion 16 of the collar, to enter a conical channel or groove 28 in the enlarged part 12 of the axle 10 formed in the face 17 adjacent to the inner portion of the tapered part 16.

In practice, it is usual to force the car wheels on to the tapered part of the axle under many tons of pressure, and if one of the wheels is to be loose or have a relative movement, it should be done under substantially the same conditions as the fixed wheel and without any fastening means that is liable to become loose while the invention is in use. This is accomplished with my invention by having the thimble forced upon the tapered part 10 after being placed in the opening in the wheel 18 with approximately the same pressure as the wheel 19 is forced on the other end of the axle, as the bushing is forced on the tapered part 16 the bendable end 26 will enter the conical or tapering channel 28 of the axle and be forced inward as shown, thus serving further to bind and hold the bushing to the axle and rigidly mounting the wheel 18 against possible detachment at the same time avoiding any accident that might occur by reason of such detachment.

While the car is moving in a right line or straight path, it is the intention that the two wheels should rotate with the axle as if both were fixed. In case of a curve one wheel, as wheel 18, will permit a proper relative movement between the wheels and the axle, which under ordinary conditions may be very slight so that the relative movement of the so-called loose wheel will not in any case be sufficient to cause much wear or friction between the relative moving surfaces. To reduce this wear, I have provided means for lubricating the bearing surfaces between the wheel 18 and the bushing; though this lubricating means may be varied and the extent of the lubrication also varied as desired. As one means a slight channel or groove 29 is provided across the wheel 18 along the opening 23 thereof, or along the bushing as preferred, and an oil channel or opening 80 leading thereto extends at an angle through the hub portion of the wheel 18, in which a heavy or other lubricant may be placed. The outer end of the channel or opening 80 may be closed by a plug 81 to prevent dirt or other objectionable matter from entering the opening.

From the foregoing, it will be seen that simple and efficient means are provided whereby one of the wheels of an axle may be held to have an independent relative movement thereon and the wheel at the other end thereof fixed, that said wheels are so held to the axle that all liability of them becoming detached while in use is overcome; and that simple and effective means is provided for holding the loose wheel to the axle.

Having thus described my invention, I claim as new and desire to secure by Letters Patent:—

1. The combination of an axle having an enlarged portion provided with a tapering channel and a tapered portion projecting outward from said enlarged portion, a bushing held to said tapered portion of the axle under pressure and having a bendable end fitting said channel and with an integral collar at the end thereof opposite the bendable end, and a wheel interposed between the collar of the bushing and the enlarged part of the axle and adapted to move about said bushing.

2. The combination of an axle having a tapering annular channel, a bushing held to the axle under pressure and having a bendable end adapted to be forced into said channel and with an integral collar at the end thereof opposite the bendable end, and a wheel interposed between the collar of the bushing and a part of the axle and adapted to move about said bushing.

3. The combination of an axle having an enlarged portion provided with a channel larger at one end than at the other and a tapered part projecting outward from said enlarged portion, a bushing held to said tapered portion of the axle and having an end adapted to be forced into said channel and with a collar at the end thereof opposite the bendable end, and a wheel interposed between the collar of the bushing and the enlarged part of the axle and adapted to move about or with said bushing.

4. The combination of an axle having a tapered portion, a bushing having a bendable portion and held to the tapered part of the axle under pressure, said bendable portion engaging a part of the axle and holding the bushing thereto, and a wheel mounted on the bushing to rotate thereon and held between the bushing and a part of the axle.

5. The combination of an axle having an enlarged part, a bushing having a bendable portion and rigidly held to a part of the axle, said bendable portion engaging a part of the axle and holding the bushing thereto, and a wheel mounted upon the bushing to rotate thereon or with the axle and held between the bushing and a part of the axle.

6. The combination of an axle having an enlarged portion provided with an annular channel and a tapered portion projecting outward from said enlarged portion, a bushing held to said tapered portion of the axle under pressure and having an end fitting said channel, a wheel interposed between a part of the bushing and the enlarged part of the axle and adapted to move about said thimble, and means for lubricating the bear ing surface between the bushing and the wheel.

7. The combination of an axle having an enlarged part, a bushing having a bendable portion and rigidly held to a part of the axle, said bendable portion engaging a part of the axle, a wheel mounted upon the bushing to rotate thereon and held between the bushing and the enlarged part of the axle, and means for lubricating the bearing surface between the bushing and the wheel.

This specification signed and witnessed this fourth day of May A. D. 1912.

PHILIP J. RIVERS.

Witnesses:
  C. BARTELS,
  LESTER C. TAYLOR.

Copies of this patent may be obtained for five cents each, by addressing the "Commissioner of Patents, Washington, D. C."